United States Patent

Cassidy et al.

Patent Number: 5,482,084
Date of Patent: Jan. 9, 1996

[54] EAVESTROUGH DOWNSPOUT

[76] Inventors: Douglas A. Cassidy, 335 Parkwood Close S.E., Calgary, Alberta, Canada, T2J 3V9; Ronald S. Kossowan, #321, 1313 13th Avenue S.W., Calgary, Alberta, Canada, T2C 3S1

[21] Appl. No.: 435,427

[22] Filed: May 10, 1995

[51] Int. Cl.⁶ .................................................. F16L 27/00
[52] U.S. Cl. ........................................ 137/615; 137/120
[58] Field of Search .................................. 137/615, 120, 137/121

[56] References Cited

U.S. PATENT DOCUMENTS

| | | | |
|---|---|---|---|
| 427,206 | 5/1890 | Suddick | 137/120 |
| 725,451 | 4/1903 | Keller | 137/121 |
| 1,525,637 | 2/1925 | Bot | 137/120 |
| 2,567,004 | 9/1951 | Benck | 137/120 |
| 3,060,952 | 10/1962 | Bystrom | 137/67 |
| 3,316,928 | 5/1967 | Weakley | 137/119 |
| 3,375,851 | 4/1968 | Fitzhenry | 137/396 |
| 3,861,419 | 1/1975 | Johnson | 137/615 |
| 3,911,954 | 10/1975 | Johnson | 137/615 |
| 4,135,540 | 1/1978 | Felsen | 137/78 |
| 5,014,745 | 5/1991 | Watt | 137/615 |

*Primary Examiner*—Stephen M. Hepperle
*Attorney, Agent, or Firm*—Bennett Jones Verchere

[57] ABSTRACT

A automatic downspout is taught having an extension which swings, in response to passage of water through the downspout, between a storage position and a position for transport of water. The extension has connected thereto a reservoir for retaining an amount of water from the water passing through the downspout. The weight of the water retained by the reservoir acts to maintain the extension in the lowered position for a selected period of time after the passage of water through the downspout stops. An actuator for such an automatic downspout is also taught.

8 Claims, 6 Drawing Sheets ns5,482,084

EAVESTROUGH DOWNSPOUT

FIELD OF THE INVENTION

The present invention relates to a downspout extension and, in particular, an automatic downspout which moves between a storage position and an in use position in response to passage of water therethrough.

BACKGROUND OF THE INVENTION

Downspouts having hinge arrangements are known for attachment to the eavestrough systems of buildings. The hinge arrangements facilitate the swinging up and down of a hinged extension for passage therebelow of lawn-grooming equipment and the like.

Although, the hinged extensions conventionally have been actuated manually, some arrangements have been devised for releasing the hinged extension in response to the passage of rain water through the downspout. Some other arrangements have been devised for automatically returning the hinged extension to a storage position after the passage of rain water has stopped. For example, U.S. Pat. No. 3,375,851 to Fitzhenry et al., issued Apr. 2, 1968, discloses a downspout in which a hinged extension is lowered from a storage position into a position for use when a counterbalanced receptacle in association with the hinged extension fills with rain water. The hinged extension of this downspout is actuated to return to the storage position when the passage of water through the downspout is insufficient to overcome the force of a counterweight tending to rotate the extension upwards. This downspout requires a steady, heavy flow of water through the extension to maintain it in its lowered position. In weather conditions where the precipitation is light or intermittent the extension swings up and down. This has been found to inhibit customer acceptance and to cause failure of the hinge attachment. An automatic downspout extension is needed which is effective during light and intermittent rainfall as well as during heavy rainfall.

SUMMARY OF THE INVENTION

An automatic downspout has been invented having an extension which swings from a storage position into a position for transport of water in response to passage of water through the downspout and remains in such a position for a selected period after the passage of water has stopped or slowed before returning to a storage position.

In accordance with a broad aspect of the present invention there is provided an eavestrough downspout comprising an extension member for transporting water from an eavestrough system, the member being moveable between a storage position and a lowered position for transporting water away from the eavestrough system, and an actuator responsive to passage of water through the downspout to exert a force on the extension member to move the extension member between the storage position and the lowered position, the extension member having a reservoir for retaining an amount of water therein when in the lowered position, the reservoir being formed to retain an amount of water selected to have a relative weight in combination with the extension member sufficient to act against the force of the actuator to maintain the extension member in the lowered position.

In accordance with a further broad aspect of the present invention there is provided an eavestrough downspout comprising an extension member for transporting water from an eavestrough system, the member being moveable between a storage position and a lowered position for transporting water away from the eavestrough system, and an actuator responsive to passage of water through the downspout to exert a force on the extension member to move the extension member between the storage position and the lowered position, the extension member having a reservoir for retaining an amount of water therein when in the lowered position, the reservoir being formed to retain an amount of water selected to have a relative weight in combination with the extension member sufficient to act against the force of the actuator to maintain the extension member in the lowered position and the actuator comprising a receptacle for accumulating water from the eavestrough system and for passing the accumulated water to the extension member, a means for biasing the receptacle against downward linear movement and a means for translating any linear movement of the receptacle to rotational movement to drive the extension member.

DESCRIPTION OF THE INVENTION

The invention provides an eavestrough downspout comprising an extension member for transporting water from the eavestrough system. The extension member is moveable between a storage position and a position for transporting water away from the eavestrough system by an actuator which exerts a force to move the member in response to passage of water through the downspout. The extension member has a reservoir for retaining an amount of water when the extension is in its lowered position.

The reservoir acts to retain an amount of water during a rainfall such that when the rainfall has slowed or stopped the extension member will remain in the lowered position. The extension remains in the lowered position since the weight of the extension member, including the weight of the water retained in the reservoir, is sufficient to exceed the actuator's ability to return the extension to the storage position. The extension member will remain in the lowered position until such time as an amount of water remains in the reservoir which has an insufficient relative weight, in combination with the weight of the extension member, to overcome the force of the actuator.

The reservoir can be any suitable size and shape to hold water and can be placed at any convenient position along the member to act against the force exerted by the actuator. However, as will be understood, the size of the reservoir can be minimized by positioning the reservoir adjacent the outer end of the extension member.

The reservoir is adapted in any suitable way to allow the gradual removal or leakage of the amount of water from the reservoir. In one embodiment, the water is allowed to escape from the reservoir by evaporation. In another embodiment, apertures are formed in the reservoir to permit the gradual leakage of the water from the reservoir.

In an embodiment, a filtering means, such as a screen or filter, is provided at the opening to the reservoir to prevent the entry of debris.

The reservoir can be formed integral with the extension member or attached to the extension member in any suitable way. In one embodiment, the extension member is formed of moulded plastic and the reservoir is moulded as a dished portion integral with the extension member. In another embodiment, the reservoir is formed separately from the extension and is secured thereto by means of a suitable adhesive. The reservoir can be open to collect water during rainfall or can be formed to retain an amount of water from that being transported through the extension member.

The extension member can be formed in any suitable way to carry water therethrough or therealong such as, for example, a trough or a tube.

The actuator can be of any suitable type such as, for example that actuator mechanism disclosed in U.S. Pat. No. 3,375,851. Using such an actuator mechanism, the reservoir is formed to retain an amount of water of sufficient weight, in combination with the weight of the trough, to overcome the force exerted by the counterweight.

In another embodiment an actuator is used which comprises a receptacle positioned to accept and accumulate water from an eavestrough system and to pass it to the extension member. Changes in the weight of the receptacle, as a result of the accumulation of water, cause the receptacle to move downwardly. The downward movement of the receptacle drives a series of gears which transform the linear motion of the receptacle into rotational motion to drive the extension member from its storage position to its lowered position. As the weight of the receptacle is reduced by emptying the accumulated water through the lowered extension member, the receptacle moves upwardly which reverses the gears and drives the extension member into its storage position.

The downspout is positioned to accept water from an eavestrough system. In a preferred embodiment, the downspout is attached to the eavestrough system and provides a continuous conduit with the eavestrough system for transport of water.

In an embodiment, the actuator of the downspout is enclosed by a housing and the extension member is mounted outwardly of the housing. The housing is provided with ports for communication of the actuator with the extension member, for the passage of water to the extension member and for release of water from the housing, in the instance of an overflow.

In one embodiment, the downspout is provided with minute apertures for releasing residual quantities of water which remain in the downspout extension when the extension member is in the storage position. In another embodiment, the downspout is wrapped with a high resistance wire to prevent the formation of ice.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DESCRIPTION OF THE PREFERRED EMBODIMENTS

While the extension member having a reservoir according to the present invention is shown only with the preferred actuator mechanism, it is to be understood that the reservoir can be used to regulate the action of any automatic downspout extension that also acts by passage of water therethrough.

Figure 1A:
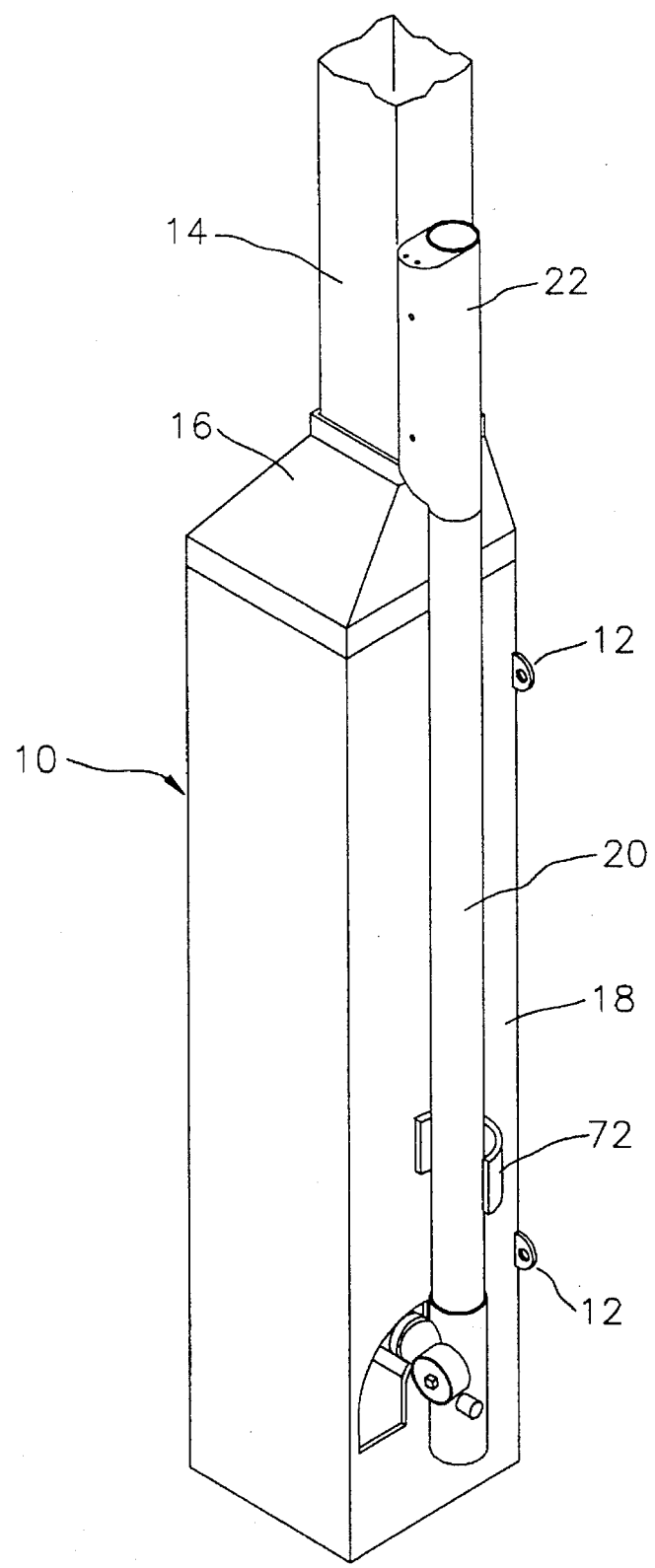
FIG. 1A is a perspective view of a downspout of the present invention with the extension member in a stored position.
Figure 1B:
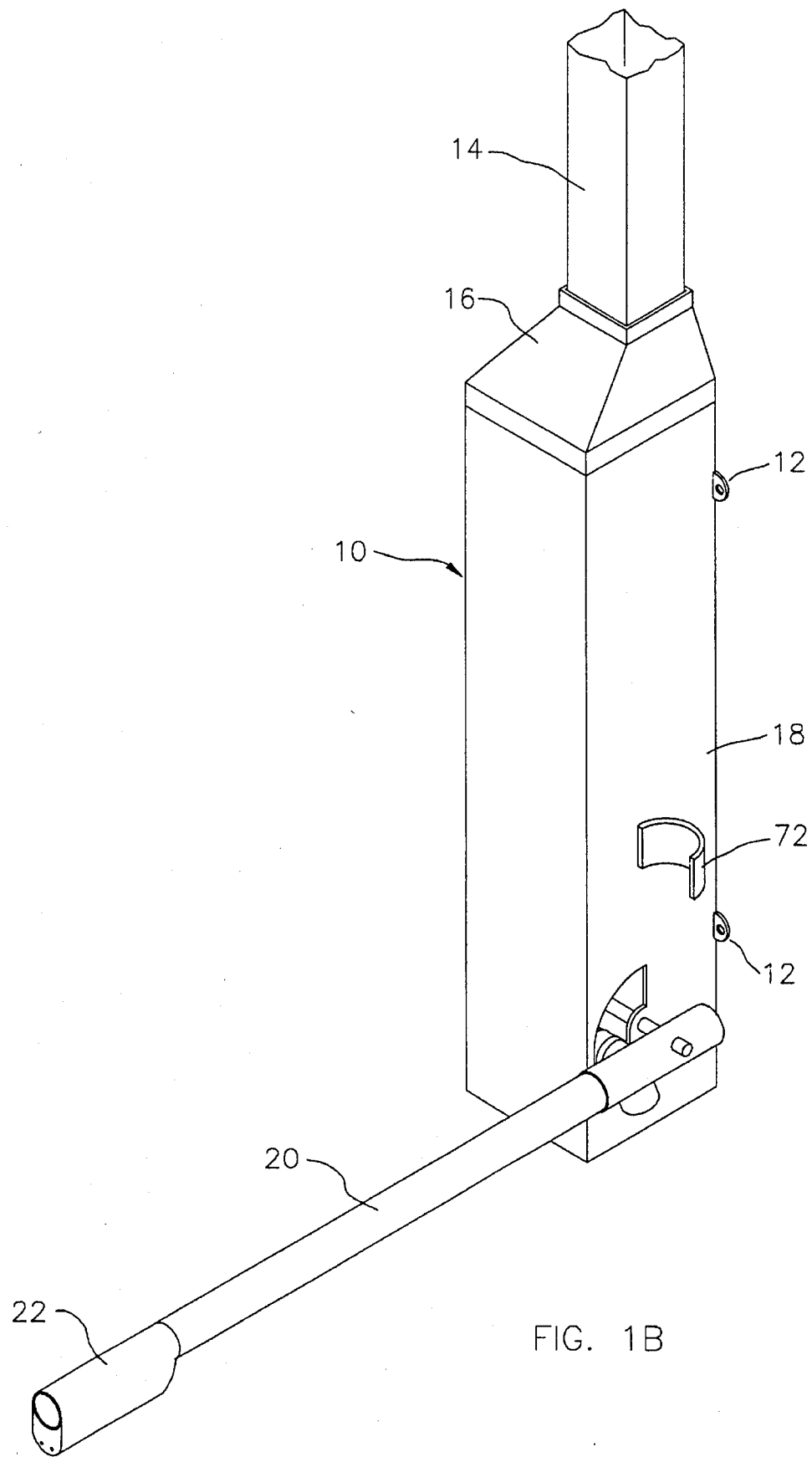
FIG. 1B is a perspective view of the downspout of FIG. 1A with the extension member in a lowered position for transport of water.

FIGS. 1A and 1B show a preferred downspout 10 according to the present invention. Downspout 10 is mounted, by use of tabs 12, on a structure in connection with an existing downspout tube 14 to bring water from an eavestrough. A housing 18 encloses a downspout actuator (not shown in this Figure), which will be discussed hereinafter. A cap 16 completes the enclosure for the actuator and seals to tube 14. The actuator drives the pivotal movement of a downspout extension member 20 in response to the passage of water through downspout 10 between a storage position, shown in FIG. 1A, and a lowered position for transporting water, as shown in FIG. 1B. Extension member 20 is blocked to prevent flow of water therefrom at a first end and is open at its opposite end. Adjacent its opposite end is connected a reservoir 22 formed to retain an amount of water therein. Reservoir 22 is connected to extension member 20 in any suitable way.

Figure 2A:
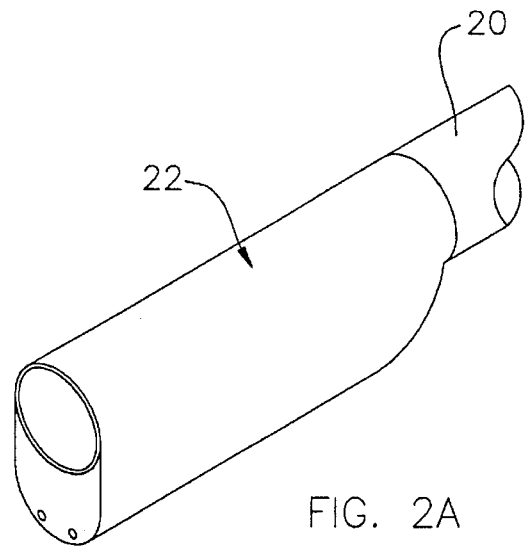
FIG. 2A is a perspective view of a reservoir of a downspout of the present invention.
Figure 2B:
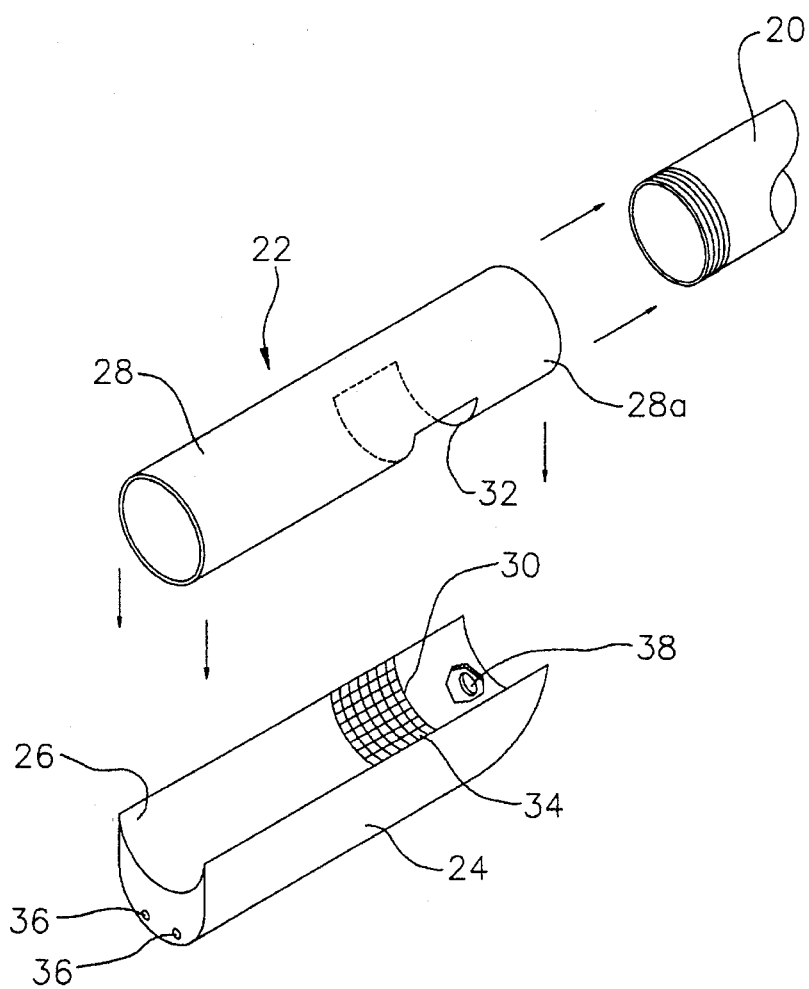
FIG. 2B is an exploded view of the reservoir of FIG. 2A, partially cut away to expose an interior portion of the reservoir.

Referring to FIG. 2A, a preferred embodiment of a reservoir 22 is shown. An assembled reservoir 22 is attached at an end of extension member 20 to collect water passing through extension member 20. Referring to FIG. 2B, reservoir 22 comprises an enclosed container 24 having a first surface 26 for connection (such as by snap connections or adhesives) to an extension connector 28. Extension connector 28 is adapted at one end 28a for connection to extension member 20 such as by snap connections, frictional engagement, solvent welding or adhesives.

First surface 26 has formed therein an opening 30 which is aligned during assembly to an opening 32 formed in connector 28. Openings 30, 32 provide for the movement of water from the interior of connector 28 into container 24. A screen 34, or other means such as a removable filter (not shown), is preferably disposed across opening 30 to prevent debris from entering container 24. Container 24 has formed therein a plurality of apertures 36 to permit the slow leakage of any water contained therein. In a preferred reservoir 22, container 24 has also formed therein a large aperture 38. Aperture 38 is positioned at an end of container 24 adjacent the attachment to extension member 20 to provide for rapid evacuation of water from container 24 when the extension member begins to move into storage position. Where aperture 38 is not provided, the remaining in container 24 can be allowed to drain back down the extension towards the housing. The reservoir for mounting on the extension member can be any suitable shape or construction to allow for the retention of water therein.

Figure 3A:
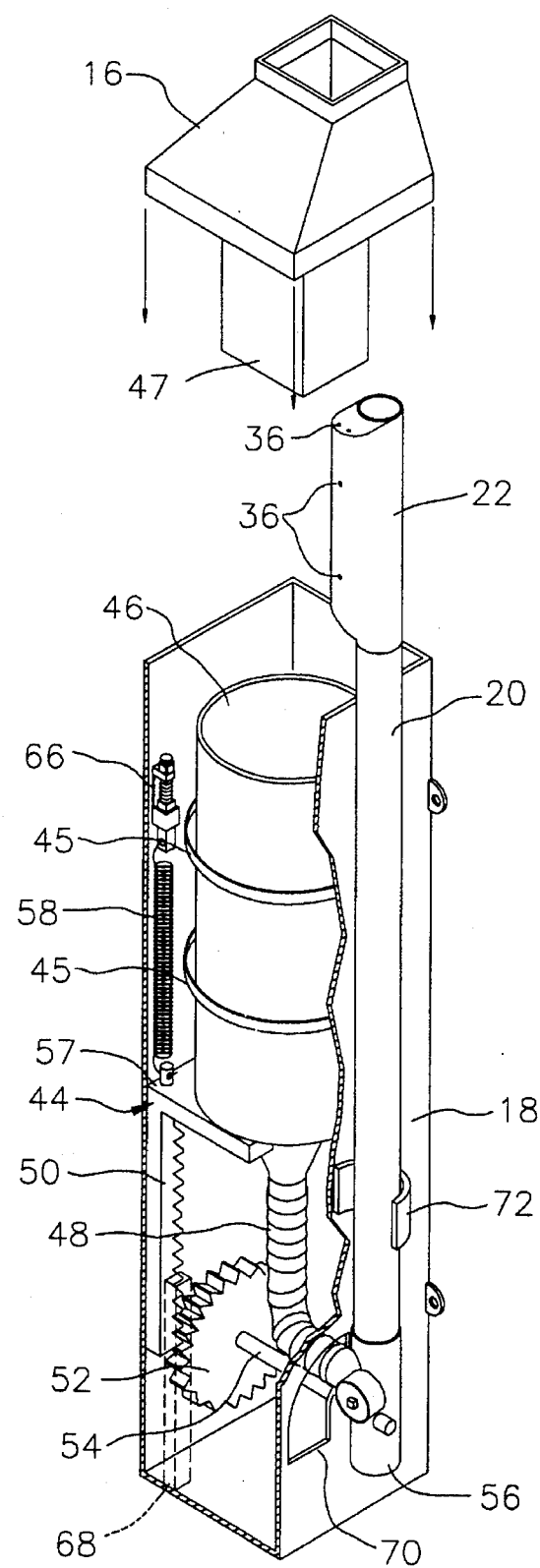
FIG. 3A is a partially cutaway exploded view of a downspout of the present invention.
Figure 3B:
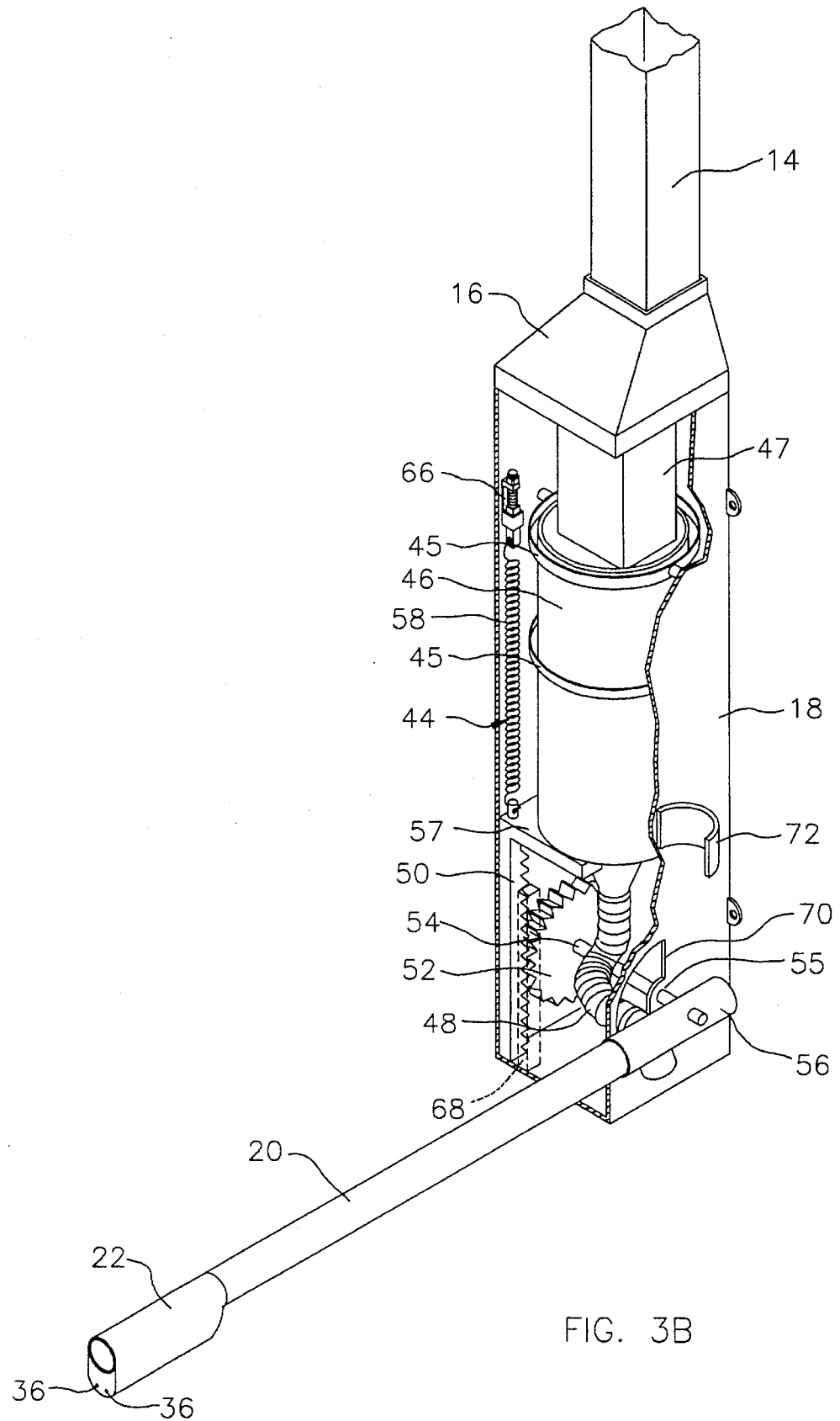
FIG. 3B is a partially cutaway perspective view of the downspout of FIG. 3A.

Referring to FIGS. 3A and 3B there is shown a preferred embodiment of a downspout according to the present invention with a portion of the housing 18 removed and cut away to expose a preferred actuator assembly 44. Actuator assembly 44 is responsive to passage of water through the downspout to drive extension member 20 between the positions shown in FIGS. 1A and 1B. Extension member 20 is preferably formed as a tube having any suitable cross section and is preferably selected to correspond to the appearance of tube 14. A reservoir 22 is formed at the outer end of member 20. Actuator 44 comprises a receptacle 46 for receiving water and a flexible conduit 48 connected between receptacle 46 and extension member 20. Preferably, receptacle 46 is maintained in a vertical position within housing 18 by retaining rings 45 and a conduit 47 which extends downwardly from cap 16. In the preferred embodiment, actuator 44 further comprises a rack gear 50 enmeshed with a pinion 52. Pinion 52 is rigidly mounted in any suitable way on a shaft 54. Shaft 54 rides on bearings 55 (only one can be seen) formed from housing 18 and is rigidly connected through a T-fitting 56, or any other suitable connection to extension member 20.

Rack gear 50 is attached beneath a platform 57 on which receptacle 46 rests. Preferably, receptacle 46 is not attached to platform 57 so that receptacle 46 is free to rotate. Free rotation of receptacle 46 facilitates movement of conduit 48 and prevents binding thereof. Rack gear 50 and platform 57 are held under tension by spring 58.

During periods in which there is no precipitation, extension member 20 is maintained in a storage position as shown in FIG. 3A. When extension member 20 is in the storage position, the actuator assembly is as shown with rack gear 50 biased in the upward direction by spring 58.

During a rainfall, water begins to pass from an eavestrough tube 14 through cap conduit 47 and into receptacle 46. Since extension member 20 is in the storage position water accumulates in receptacle 46, conduit 48 and the base of extension member 20. As water accumulates in receptacle 46 the weight of the water causes the receptacle to bear down on platform 57 and overcome the tension in spring 58. This drives rack gear 50 downwardly and thereby causes pinion 52 to rotate shaft 54. The rotation of shaft 54 in turn causes extension member 20 to be rotated out of a substantially vertical position. When such rotation occurs the water which has accumulated in the base of extension member 20 the centre of gravity of the extension shifts until it is beyond the pivotal point of shaft 54 in T-fitting 56. The extension member then moves quickly into a lowered position, as shown in FIG. 3B, by the action of the gear drive assisted by the weight of the extension. In this lowered position water can be passed from the downspout through the downspout extension.

As water passes along extension member 20, an amount of water is retained in reservoir 22.

After rainfall has stopped extension member 20 remains in a lowered position by action of the weight of the amount of water remaining in reservoir 22, in combination with the weight of extension member 20, overcoming the force of spring 58. As the water leaks from reservoir 22 through apertures 36, the weight is decreased and gradually the spring tension draws platform 57 and rack gear 50 upwardly and thereby extension member 20 is raised. The amount of time that the extension remains in the lowered position, after rainfall has stopped, can be controlled by selecting the rate at which the water leaks from reservoir 22 and, in this embodiment, by selecting the sizes of apertures 36. Once extension member 20 is raised to a sufficient level, water remaining in reservoir 22 will be quickly evacuated through the larger aperture 38 (FIG. 2B) and extension member 20 will be quickly rotated into storage position.

In the preferred downspout, spring 58 is attached to a spring tension gauge 66 to permit the adjustment of spring tension to accommodate extension members of various lengths and weights. The preferred housing 18 includes a rack gear guide 68 (shown in phantom) and an opening 70 to allow rotation of conduit 48 during rotation of extension member 20. Preferably a bracket 72 is disposed to accept and stabilize extension member 20 when it is in the storage position. Bracket 72 further acts to prevent over-rotation of extension member 20.

Figure 4:
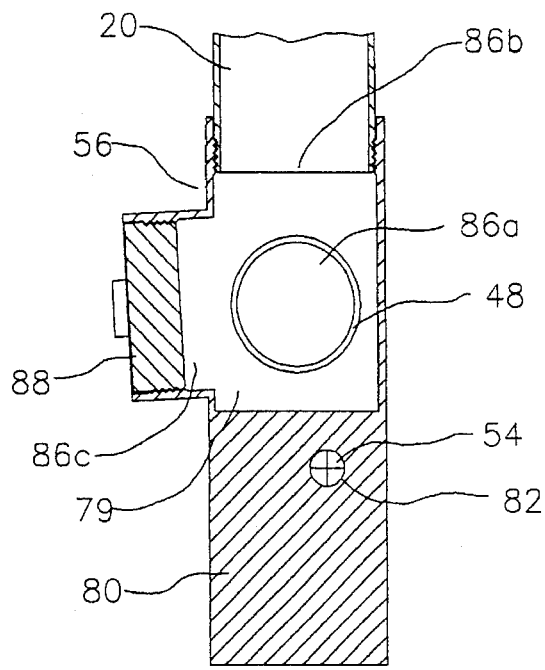
FIG. 4 is a sectional view through a T-fitting useful in the present invention; and, FIG. 5 is a perspective view of a downspout of the present invention with the extension member set in the lowered position.

Referring to FIG. 4, a preferred T-fitting 56 is shown for connection of extension member 20, conduit 48 and shaft 54. T-fitting 56 includes a hollow portion 79 and a solid portion 80 having an aperture 82 therethrough for securely accepting an end of shaft 54. Three ports 86a, 86b, 86c open into portion 79. Conduit 48 is connected at port 86a while ports 86b, 86c are similarly shaped and accept extension member 20 and plug 88 interchangeably.

Figure 5:
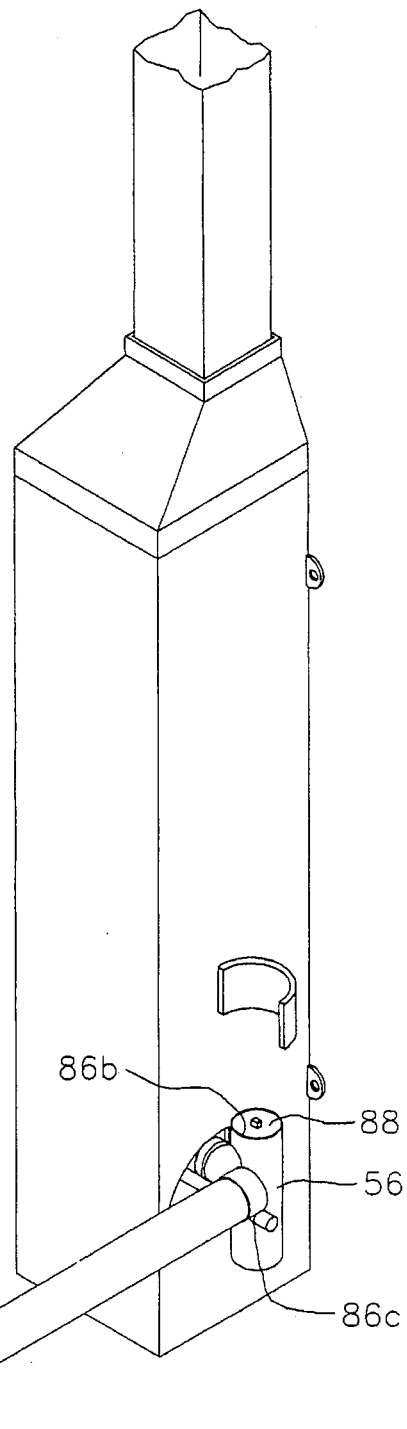

T-fitting 56 allows the downspout of the present invention to be modified to set the extension member into the lowered position for extended periods, such as would be preferred during the winter season in areas where there is a risk of ice formation. To set the extension member in the lowered position, as shown in FIG. 5, extension member 20 and plug 88 are interchanged in T-fitting 56 such that extension member 20 is connected at port 86c and plug 88 is inserted into port 86b. Thus, the extension member is held in the lowered position and water is free to pass freely through the downspout and out the extension member substantially without accumulating in the receptacle of the downspout.

It will be apparent that many changes may be made to the illustrative embodiments, while falling within the scope of the invention and it is intended that all such changes be covered by the claims appended hereto.

The embodiments of the invention in which an exclusive property or privilege is claimed are defined as follows:

1. An eavestrough downspout comprising:
    an extension member for transporting water from an eavestrough system, the member being moveable between a storage position and a lowered position for transporting water away from the eavestrough system; and,
    an actuator responsive to passage of water through the downspout to exert a force on the extension member to move the extension member between the storage position and the lowered position, the extension member having a reservoir for retaining an amount of water therein when in the lowered position, the reservoir being formed to retain an amount of water selected to have a relative weight in combination with the extension member sufficient to act against the force of the actuator to maintain the extension member in the lowered position.

2. The eavestrough down:spout as claimed in claim 1 wherein the reservoir is formed as a dished container and mounted at an outer end of the extension.

3. The eavestrough downspout as claimed in claim 1 wherein the reservoir is provided with at least one aperture to allow the amount of water to gradually leak from the reservoir.

4. An eavestrough downspout comprising:
    an extension member for transporting water from an eavestrough system, the member being moveable between a storage position and a lowered position for transporting water away from the eavestrough system; and, an actuator responsive to passage of water through the downspout to exert a force on the extension member to move the extension member between the storage position and the lowered position, the extension member having a reservoir for retaining an amount of water therein when in the lowered position, the reservoir being formed to retain an amount of water selected to have a relative weight in combination with the extension member sufficient to act against the force of the actuator to maintain the extension member in the lowered position and the actuator comprising a receptacle for accumulating water from the eavestrough system and for passing the accumulated water to the extension member, a means for biasing the receptacle against downward linear movement and a means for translating any linear movement of the receptacle to rotational movement to drive the extension member.

5. The eavestrough downspout as claimed in claim 4 wherein the means for biasing is a tensioned spring and the means for translating is a rack and pinion gear arrangement.

6. The eavestrough downspout as claimed in claim 4, further comprising a means for selectively setting the extension member into the lowered position, thereby overriding the actuator.

7. The eavestrough downspout as claimed in claim 4 wherein the reservoir is formed as a dished container and mounted at an outer end of the extension.

8. The eavestrough downspout as claimed in claim 4 wherein the reservoir is provided with at least one aperture to allow the amount of water to gradually leak from the reservoir.

* * * * *